Aug. 1, 1939.   L. DEWAN   2,167,641

TRANSMISSION MECHANISM

Filed Oct. 22, 1937

INVENTOR.
Leon Dewan
BY
ATTORNEY.

Patented Aug. 1, 1939

2,167,641

UNITED STATES PATENT OFFICE 2,167,641

TRANSMISSION MECHANISM

Leon Dewan, New York, N. Y., assignor of fifty per cent to George H. Callaghan, New York, N. Y.

Application October 22, 1937, Serial No. 170,321

2 Claims. (Cl. 74—210)

This application is a division in part of the application filed July 26, 1935, Serial No. 3,635.

The present invention relates to improvements in transmission mechanism, one object of the invention being the utilization of magnetic forces to produce a gear action between two rotating elements, so that through a driving shaft another shaft may be driven, and at the desired speed ratios and with substantially no slip.

Another object of this invention is the provision of a transmission mechanism that is simple, durable, inexpensive and practical.

Figure 1:
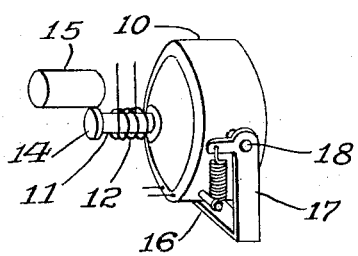
Figure 1 is a view in elevation and in diagram of one application of the present transmission mechanism, it being here specifically shown as used to transmit motion of a motion picture film.

Referring to the drawing and more particularly to Fig. 1 thereof, a sound drive motor 10 is provided with a shaft 11, which is magnetized through the medium of the solenoid 12, supplied with direct current. The shaft 11 is provided with a knob 14 upon one end, and this is pressed against the sprocket roller 15, through the medium of a spring 16 connected to the base of the motor and to a standard 17, upon which the motor is rotatably mounted by means of the axles 18. When the shaft is magnetized the knob is caused to adhere to the steel sound sprocket roller, so that motion is transmitted from the shaft 11 to the sprocket roller. In this manner, a smooth substantially silent transmission mechanism is provided, and is especially advantageous for but not limited to use with motion picture sound recording and reproducing mechanisms.

Figure 2:
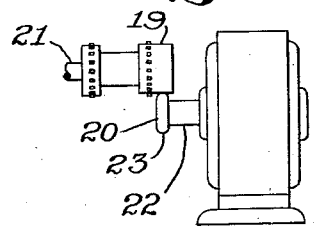
Figure 2 is a similar view showing a modified form of transmission mechanism.

In Fig. 2, this transmission mechanism is slightly different from that in Fig. 1, but the principle is the same. In this instance, the engaging members 19 and 20 are magnetized so that one shaft 21 is a north pole and the other shaft 22 is a south pole, and either or both of the members may be provided with a convex cross section tread 23, only one in this instance being shown.

Figure 3:
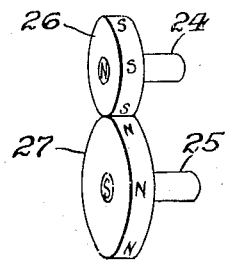
Figures 3, 4, 5, 6 and 7 are views of various other modified forms of transmission mechanism employing the same general magnetic principle.

In the modification shown in Fig. 3, two shafts 24 and 25, are north and south respectively, and each has a cylindrical disk 26 or 27, respectively, the peripheries of which are in rolling contact, so that when they are magnetized, the peripheries being of opposite polarity will attract each other. This attractive force produces a very good hold or friction between them so that the rotation of one disk will cause the other to be rotated without any slippage between the two disks. In this particular arrangement, if desired, only one disk may be magnetized, while the other disk in this instance would be made of ordinary steel.

Figure 4:
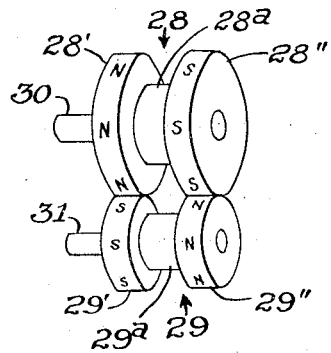

In the modification shown in Fig. 4, two spool-shaped transmission members 28 and 29 are shown, the respective peripheries 28' and 28'', of the member 28, being the north and south poles respectively of a permanent magnet, bridged by the connecting portion 28ª, and mounted upon to rotate with a shaft 30 which is of neutral polarity. The other member 29 is provided with peripheries 29' and 29'', forming with the connecting portion 29ª, a permanent magnet, in which the north pole thereof is opposed to the south pole of its cooperating periphery 28'', and its south pole periphery is opposed to the north pole of the cooperating periphery 28'. This member 29 is mounted upon a shaft 31 of neutral polarity, so that as the driving shaft 30 is rotated by any manner of means, the shaft 31 is rotated through the magnetically attracted members 28 and 29. The effect of this arrangement is that the lines of force follow a continuous path through the gears and their magnetism may be greatly prolonged. It is of course possible to use only one spool-shaped member cooperating with an ordinary solid steel roller and still get the effect of a gear coupling and a continuous field.

Figure 5:
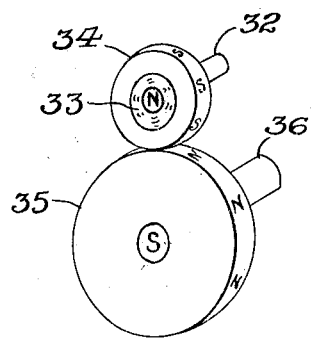

In the modification shown in Fig. 5, a flexible transmission mechanism is provided, the drive shaft 32 being provided with a rubber ring 33, or other flexible or elastic means rotatable therewith to transmit motion to the steel magnetized ring 34. This ring as shown constitutes the south pole while the shaft is the north pole, or the ring 34 itself is magnetized so that its peripheral and inner concentric surfaces are of opposite polarity. A metal disk 35, preferably of steel is rotatable with its shaft 36, and the periphery of this disk is the north pole while its shaft is the south pole, and it is engaged at all times with the periphery of the ring 34. Thus as the ring 34 is rotated, the magnetic attraction of one rotating contacting member with the other will cause a gripping action and the flexibility of connection between the shaft 32 and the ring 34 allows the peripheries of the members to be squarely in contact regardless of variations in the relation of shaft 32 to ring 34 so that even though the shafts may be slightly out of alignment, the shaft 32 will transmit motion to drive the shaft 36 through this particular form of magnetic transmission mechanism. Furthermore an allowance for a certain amount of wear is provided by this means if the two shafts are initially mounted so that the members 34 and 35 press against each other and compress the rubber ring 33.

Figure 6:
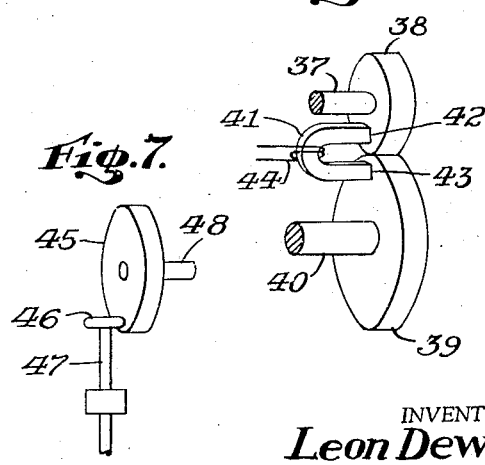

In the modification shown in Fig. 6, a drive shaft 37 carries a steel disk 38 which engages the disk 39 to drive the shaft 40, but normally if these disks are not magnetized, there would be little or no motion transmitted from one to the other. In order, however, to cause magnetic friction or attraction at the point of engagement or contact of the disks, the curved core 41 is placed, so that its north pole 42 is near the disk 38, while its south pole 43 is adjacent to the periphery of the disk 39. Thus when the core is magnetized through the medium of the coil 44, the disks at this point are caused to attract one another and a friction driving engagement is had between them.

Figure 7:
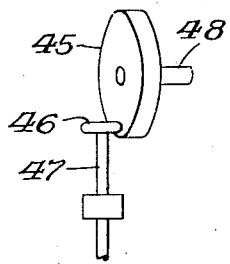

Fig. 7 illustrates a modification of the invention in which the driving shaft 47 is at right angles to the driven shaft 48. The disks 45 and 46 are magnetized in the manner previously described and the disk 46 has a convex rim. This construction is very well adapted to furnish a variable speed coupling since the distance between the disk 46 and the center of the disk 45 may be varied to a certain extent while the disks are rotating, particularly if wheel 46 is slightly turned on its point of contact with the wheel 45 as it is moved along its radius.

From the foregoing description taken in conjunction with the drawing, it is evident that the magnetic force between two rotating members is so utilized that one will drive the other, and that therefore a transmission mechanism that is toothless, smooth and frictionless in running, and simple and durable is provided.

What is claimed is:

1. A transmission mechanism including two permanently magnetized rotative elements, the peripheries of which are in contact, the entire contacting portion of the periphery of one of said rotative elements being of north polarity and the entire contacting portion of the periphery of the other being of south polarity.

2. A transmission mechanism for use in a motion picture apparatus, including two contacting rotative elements the periphery of one of which is permanently magnetized so that said periphery has the same polarity in its entire circumference.

LEON DEWAN.